United States Patent
Wang et al.

(10) Patent No.: US 6,802,181 B2
(45) Date of Patent: Oct. 12, 2004

(54) METHOD AND APPARATUS FOR MONITORING CATALYST EFFICIENCY AND SECONDARY AIR INJECTION

(75) Inventors: Wenbo Wang, Novi, MI (US); Matthew J. Roelle, Menlo Park, CA (US); Guojun Shi, Canton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/341,616

(22) Filed: Jan. 14, 2003

(65) Prior Publication Data

US 2004/0134186 A1 Jul. 15, 2004

(51) Int. Cl.[7] .................................................. F01N 3/00
(52) U.S. Cl. ............................ 60/289; 60/274; 60/276; 60/277
(58) Field of Search ......................... 60/274, 276, 277, 60/285, 289

(56) References Cited

U.S. PATENT DOCUMENTS 5,113,651 A    5/1992  Kotzan et al. ................ 60/274
5,119,631 A  * 6/1992  Kayanuma et al. ........... 60/289
5,175,997 A  * 1/1993  Blanke, Sr. ................... 60/289
5,333,446 A  * 8/1994  Itoh ............................. 60/289
5,706,653 A  * 1/1998  Shoji et al. ................... 60/277
5,782,086 A  * 7/1998  Kato et al. .................... 60/274
5,970,707 A  * 10/1999 Sawada et al. ............... 60/277

* cited by examiner

Primary Examiner—Tu M. Nguyen
(74) Attorney, Agent, or Firm—Christopher DeVries

(57) ABSTRACT

Method and apparatus to monitor secondary air injection and catalyst conversion efficiency. The method includes operating an engine in a rich condition after detecting an engine steady state condition. The secondary air injector injects air into an exhaust stream to simulate a lean engine condition. The injection of the air into the exhaust stream is ceased after both inlet and outlet sensors detect the lean condition. After ceasing air injection, a lag time is determined between the inlet sensor detecting the rich condition and the outlet sensor detecting the rich operating condition. An oxygen storage capacity of the catalytic converter is calculated based on the lag time. An efficiency of the catalytic converter is determined as a function of the storage capacity. Additionally, performance of the secondary air injector is monitored. If the inlet sensor fails to detect the lean condition after the secondary air injector is active, a fault is signaled.

18 Claims, 6 Drawing Sheets

METHOD AND APPARATUS FOR MONITORING CATALYST EFFICIENCY AND SECONDARY AIR INJECTION

TECHNICAL FIELD

The present invention relates to diagnostic systems for vehicles, and more particularly to a method and apparatus for monitoring catalytic converter efficiency and secondary air injection.

BACKGROUND OF THE INVENTION

During the combustion process, gasoline is oxidized, and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds.

Automobile exhaust systems include a three-way catalytic converter that reduces CO, HC and $NO_x$ in the exhaust gas. The efficiency of the catalytic converter is periodically monitored to prevent excess CO, HC and $NO_x$ in the exhaust gas. Typically, the catalytic converter is monitored during engine steady state conditions. At idle, for example, the engine controller adjusts the air to fuel (A/F) ratio to achieve consistent emissions output. Traditional monitoring methods force the A/F ratio to a lean or rich condition for a predetermined period. Afterwards, the controller switches to the rich or lean condition. The controller estimates an oxygen storage capacity (OSC) of the catalytic converter based on a lag time between an inlet oxygen sensor and an outlet oxygen sensor detecting the lean/rich condition. The OSC is indicative of the efficiency of the catalytic converter.

The intrusive catalytic converter monitoring test adversely impacts emissions and driveability. For example, operation in a lean A/F ratio may cause engine instability. Compensation involving more intrusive control of other engine parameters is typically required to prevent engine instability.

A secondary air injector may also be provided to inject air into the exhaust stream. The secondary air injector normally operates during a short start-up period of the engine. During the startup period, the engine is still "cold" and combustion of the gasoline is incomplete, which generates dense emissions, especially CO and HC. Additional air injected by the secondary air injector is used to quickly heat the catalyst by oxidizing the CO and HC. The warmed catalytic converter further oxidizes CO and HC, and reduces $NO_x$, to lower emissions levels.

SUMMARY OF THE INVENTION

Accordingly, the present invention provides method and apparatus for monitoring both a secondary air injector and a catalytic converter. The method includes operating an engine in a rich condition after detecting an engine steady state condition. The secondary air injector injects air into an exhaust stream to create a lean condition. The injection of the air into the exhaust stream is ceased after both inlet and outlet sensors detect the lean condition. After ceasing air injection, a lag time is measured between the inlet sensor detecting the rich condition and the outlet sensor detecting the rich condition. An oxygen storage capacity of the catalytic converter is calculated based on the lag time. An efficiency of the catalytic converter is determined as a function of the storage capacity. Additionally, a secondary air injector fault is signaled if the inlet sensor fails to detect the lean condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

Figure 1:
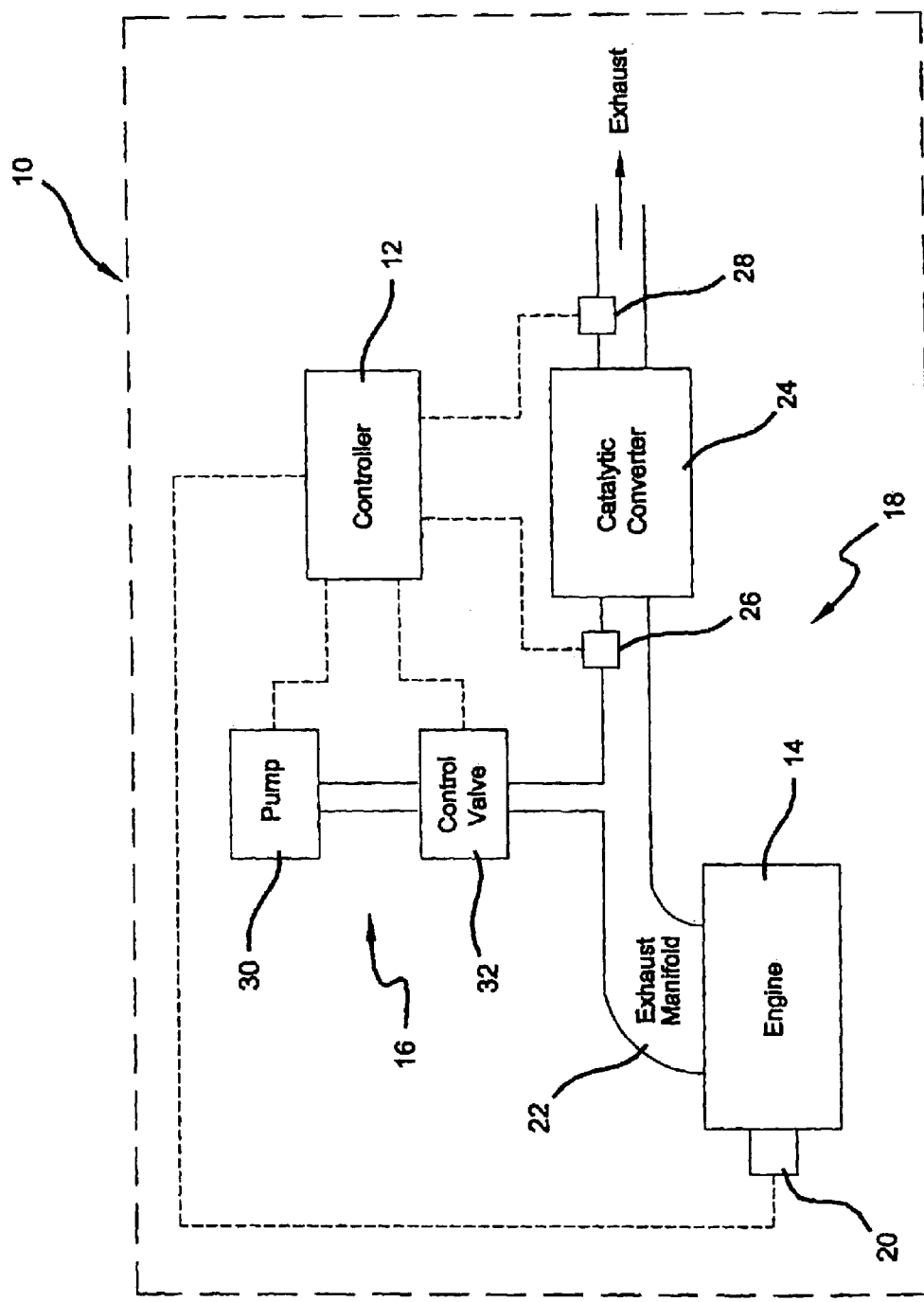
FIG. 1 is a functional block diagram of a vehicle exhaust system.

The following description of the preferred embodiment is merely exemplary in nature and is in no way intended to limit the invention, its application, or uses. For purposes of clarity, the same reference numbers will be used in the drawings to identify similar elements.

With reference to FIG. 1, a vehicle 10 includes a controller 12, an engine 14, a secondary air injector 16 and an exhaust system 18. The controller 12 communicates with various sensors, actuators and valves. The engine 14 includes a throttle 20 that communicates with the controller 12. The throttle 20 controls the amount of air drawn into the engine 14 during an intake stroke of the pistons (not shown). The amount of power produced by the engine 14 is proportional to a mass air flow rate of air into the engine 14. The engine 14 operates in a lean condition (i.e., reduced fuel) when the A/F ratio is higher than a stoichiometric A/F ratio. The engine 14 operates in a rich condition when the A/F ratio is less than the stoichiometric A/F ratio. Internal combustion within the engine 14 produces exhaust gas that flows from the engine 14 to the exhaust system 18, which treats the exhaust gas and releases the exhaust gas to the atmosphere.

The exhaust system 18 includes an exhaust manifold 22, a catalytic converter 24, an inlet oxygen ($O_2$) sensor 26 located upstream from the catalytic converter 24, and an outlet ($O_2$) sensor 28 located downstream from the catalytic converter 24. The catalytic converter 24 controls the engine-out emissions by increasing the rate of oxidization of hydrocarbons (HC) and carbon monoxide (CO), and the rate of reduction of nitrogen oxides ($NO_x$) to decrease tail-pipe emissions. To enable oxidization, the catalytic converter 24 requires air or $O_2$. When the exhaust is in rich condition, the converter can release the $O_2$ stored in lean condition or from excess $O_2$ generated by the reduction reaction. The $O_2$ storage and release capacity of the catalytic converter 24 is indicative of the catalytic converter's efficiency in oxidizing the HC and CO, and reducing $NO_x$. The inlet $O_2$ sensor 26 communicates with the controller 12 and measures the $O_2$ content of the exhaust stream entering the catalytic converter 24. The outlet $O_2$ sensor 28 communicates with the controller 12 and measures the $O_2$ content of the exhaust stream exiting the catalytic converter 24.

The secondary air injector 16 includes an air pump 30 and a valve 32. The secondary air injector 16 is operated during a short start-up period (approximately 30 to 40 seconds) after the engine is started. If the engine 14 is "cold", the fuel within the cylinders (not shown) is not sufficiently burned, which increases HC and CO levels in the exhaust gas. The secondary air injector 16 injects secondary air into the exhaust stream to increase HC and CO oxidization. Additionally, the oxidization quickly heats the catalytic converter 24, significantly benefiting the conversion of HC, CO, and $NO_x$. In this manner, emissions during the cold start-up period are adequately controlled. Both the air pump 30 and valve 32 communicate with the controller 12. The controller 12 initiates operation of the pump 30 and opening of the valve 32 to enable injection of air into the exhaust.

Figure 2:
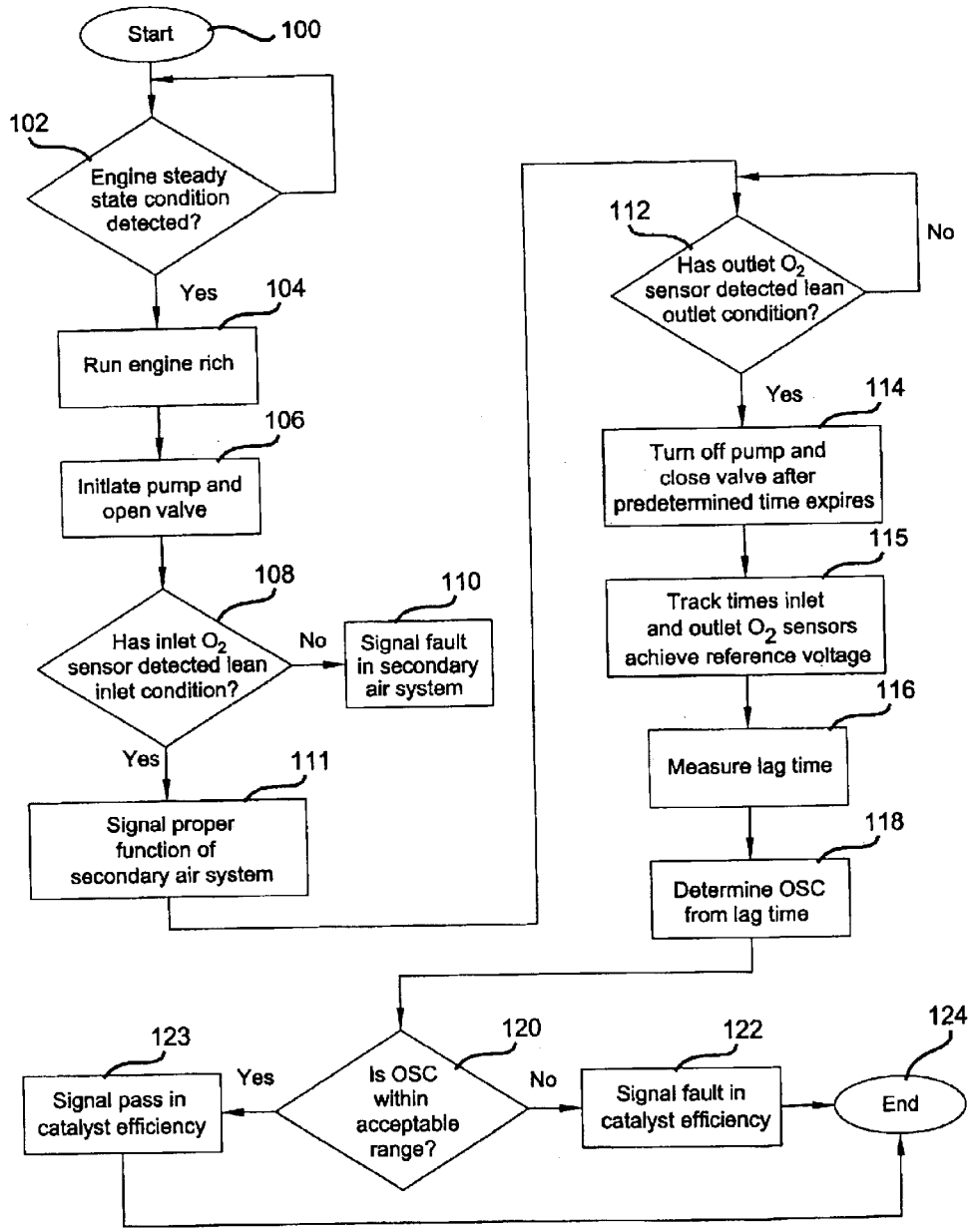
FIG. 2 is a flowchart illustrating a method for monitoring catalyst efficiency and secondary air injection according to the present invention.

With reference to FIG. 2, a method of measuring the $O_2$ storage capacity of the catalytic converter 24 is shown. Control begins with step 100. In step 102, the controller 12 determines whether the engine 14 is operating at idle. If the engine 14 is not operating at idle, control loops back to step 100. If the engine 14 is operating at idle, the controller 12 causes the engine 14 to run in a rich condition in step 104. In step 106, the controller 12 initiates operation of the pump 30 and opening of the valve 32 to supply air into the exhaust manifold 22. In this manner, $O_2$ is injected into the rich exhaust stream to create a lean exhaust stream.

In step 108, the inlet $O_2$ sensor 26 is checked by the controller 12 to determine whether the inlet $O_2$ sensor 26 has detected the created lean condition. If the inlet $O_2$ sensor 26 does not detect the lean condition, a fault is signaled in step 110 to indicate that the secondary air injector 16 is not functioning properly. If the inlet $O_2$ sensor 26 does detect the lean condition, a signal indicates that the secondary air injector 16 is functioning properly, in step 111, and control continues with step 112. In step 112, the controller 12 determines whether the outlet $O_2$ sensor 28 has yet detected the lean condition. If the outlet $O_2$ sensor 28 has not detected the lean condition, control loops until the outlet $O_2$ sensor 28 detects the lean condition.

Once the outlet $O_2$ sensor 28 detects the lean condition, the controller 12 continues to operate the pump 30 for a predetermined period of time, to make the catalytic converter 24 saturated. Once the predetermined period of time expires, the controller 12 turns off the pump 30 and closes the valve 32 in step 114. With the secondary air injector 16 turned off and the engine 14 still running rich, the $O_2$ level of the exhaust stream decreases. The inlet $O_2$ sensor 26 eventually detects the rich condition. As the rich exhaust stream is treated in the catalytic converter 24, the outlet $O_2$ sensor 28 eventually detects the rich condition. Control continues with step 115, where the controller 12 tracks the time it takes the inlet $O_2$ sensor 26 and the outlet $O_2$ sensor 28 to achieve a reference voltage. It should be noted that prior to executing step 115, the controller may optionally command the engine to operate the same as, more rich, or less rich than commanded in step 104.

Figure 3:
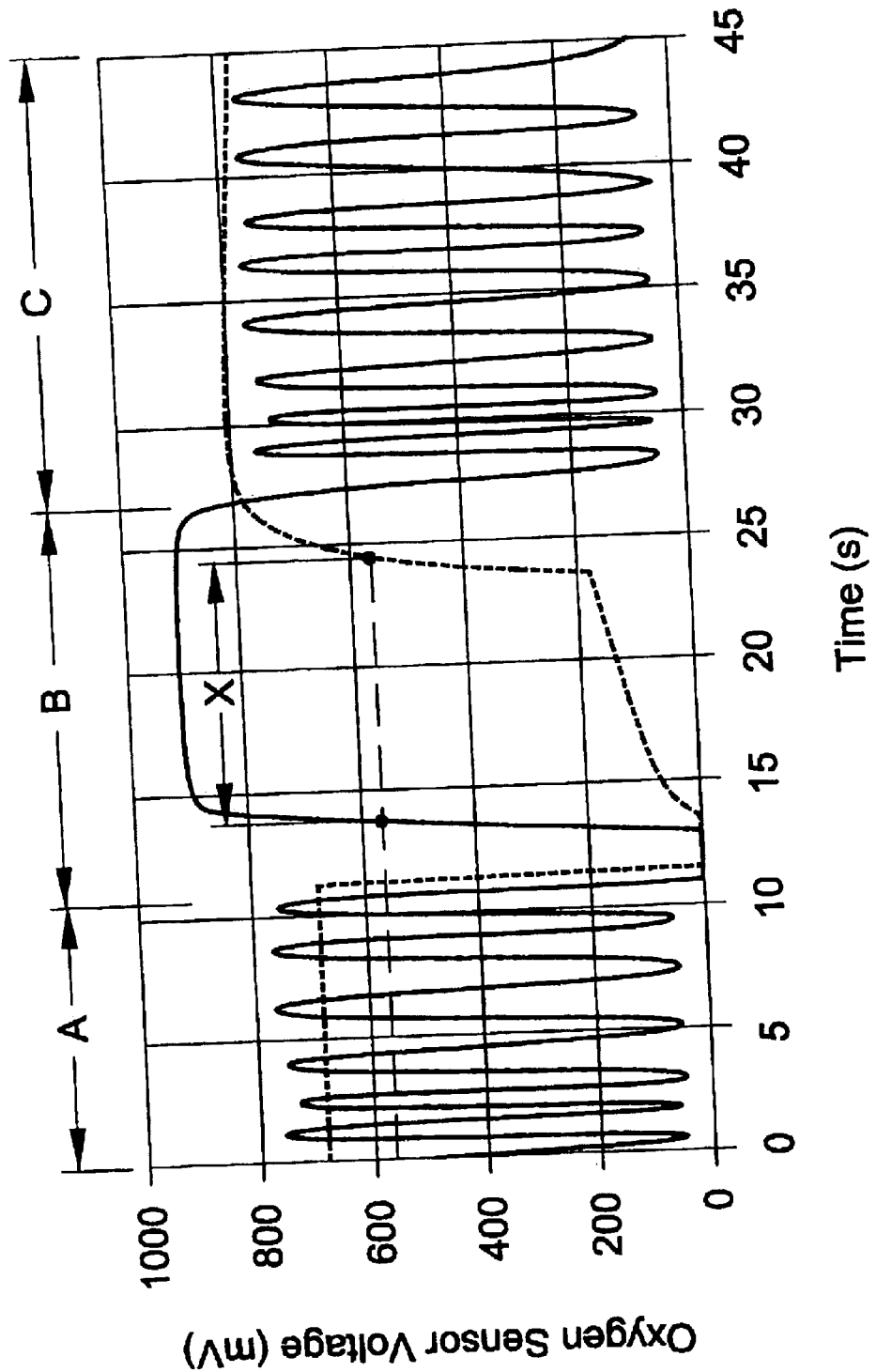
FIG. 3 is a graph showing inlet and outlet oxygen sensor voltage as a function of time according to the present invention.

In step 116, the controller 12 measures the lag time between the inlet $O_2$ sensor 26 achieving the stoichiometric, or rich reference voltage, and the outlet $O_2$ sensor 28 achieving the same (see FIG. 3). After determining the lag time, control continues with step 118 where the controller 12 determines the oxygen storage capacity (OSC) of the catalytic converter based upon the lag time. In step 120, the controller 12 determines whether the OSC of the catalytic converter 24 is above a pre-calibrated level. If the OSC is not above the calibration level, then a fault is signaled in step 122. If the OSC is above the calibration level, then the algorithm signals that the catalytic converter 24 is functioning properly in step 123. The method ends at step 124.

With reference to FIG. 3, $O_2$ sensor voltage (measured in mV) is shown as a function of time (measured in seconds). More specifically, the graph of FIG. 3 is divided into three sections, section A (pre-test), section B (test), and section C (post-test). The continuous line represents the inlet $O_2$ sensor voltage and the dashed line represents the outlet $O_2$ sensor voltage. The sinusoidal form of the inlet $O_2$ sensor voltage through sections A and C indicates the cycling between lean and rich engine conditions that enables consistent exhaust emissions content during idle.

To initiate measurement of the catalytic converter's OSC, the controller 12 causes the engine 14 to operate rich upon detecting engine idle. The controller 12 initiates operation of the pump 30 and opens the valve 32 to inject air into the exhaust stream to create a lean exhaust stream. As the lean exhaust stream flows through to the catalytic converter 24, the voltage of the inlet $O_2$ sensor 26 drops as the $O_2$ content of the exhaust stream increases. This is indicated at the beginning of section B. There is a lag between the inlet $O_2$ sensor 26 and the outlet $O_2$ sensor 28 detecting the lean condition, while the exhaust stream is treated within the catalytic converter 24. Once the outlet $O_2$ sensor 28 detects the lean condition, the controller 12 continues operation of the pump 30 for a predetermined period of time, to achieve saturation of the catalytic converter 24. Once the predetermined period of time expires, the controller 12 ceases air injection into the exhaust stream and the exhaust stream reverts to a rich condition.

As the engine 14 operates rich, thereby decreasing the $O_2$ content of the exhaust stream, the voltage of the inlet $O_2$ sensor increases and stabilizes through section B. As the exhaust stream is gradually treated in the catalytic converter 24, the $O_2$ content decreases, and the outlet $O_2$ sensor 28 detects the decreased $O_2$ content of the exhaust stream. Eventually, a sharp increase in the outlet $O_2$ sensor voltage occurs, and the $O_2$ content of the catalytic converter 24 is at a minimum, as indicated at the end of section B. Once the outlet $O_2$ sensor 28 detects the rich condition of the catalytic converter, the controller 12 initiates normal idle operation of the engine 14, as indicated by the sinusoidal form of the inlet $O_2$ sensor voltage in section C.

A lag time X in section B identifies the lag between the inlet $O_2$ sensor 26 and the outlet $O_2$ sensor 28 detecting a low $O_2$ content condition of the catalytic converter 24. This value is determined at a reference voltage, preferably indicative of a stoichiometric condition. The controller 12 measures the lag time X, from which the OSC is determined. The efficiency of the catalytic converter 24 can also be determined by the controller 12 based upon the OSC.

Figure 4:
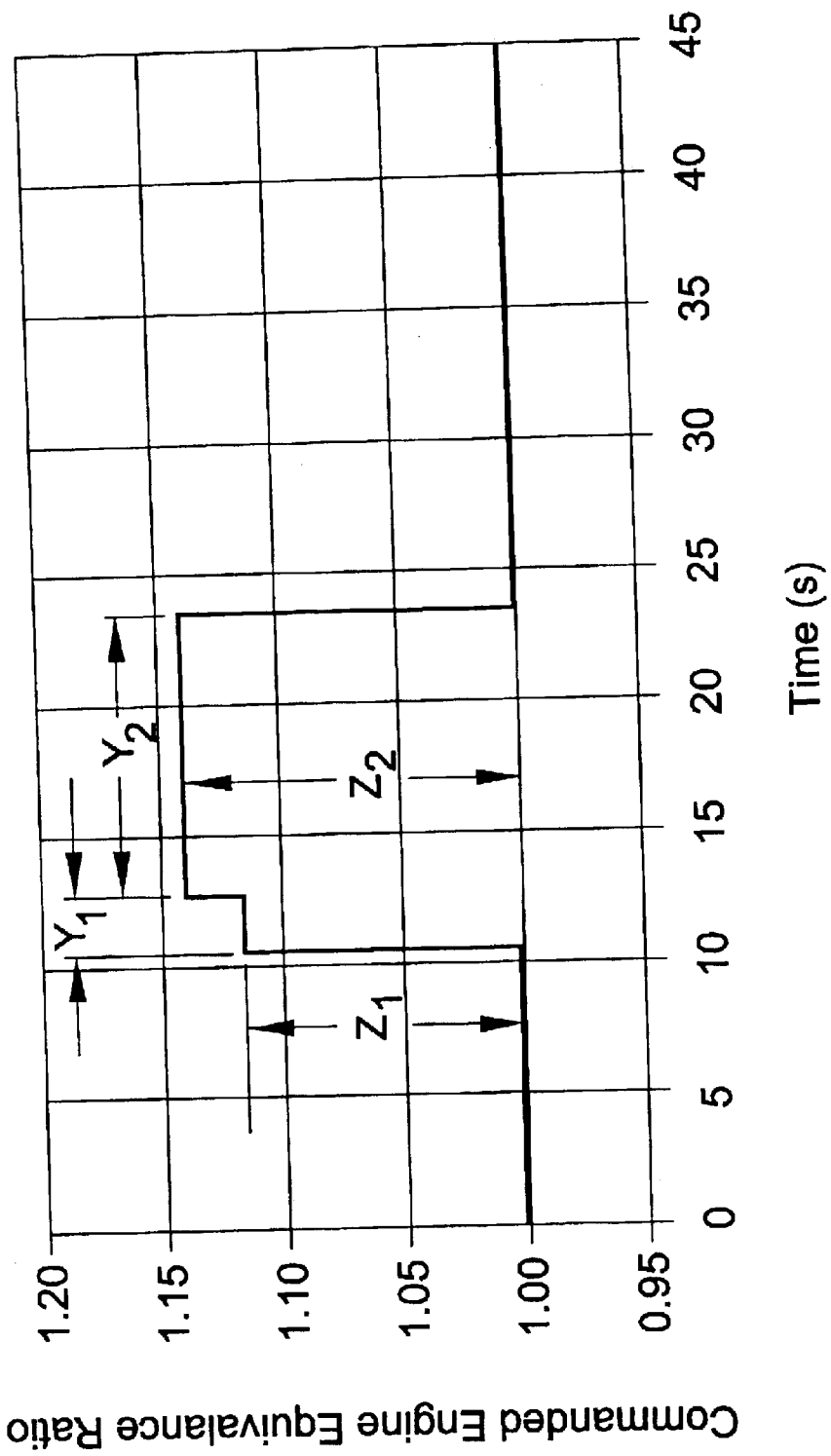
FIG. 4 is a graph showing a corresponding commanded equivalence ratio as a function of time for the data in FIG. 3.

With reference to FIG. 4, a commanded engine equivalence (CEE) ratio is graphically shown as a function of time. The CEE ratio is defined as the stoichiometric A/F ratio $(A/F_{stoich})$ divided by the actual A/F ratio $(A/F_{actual})$, as determined by the controller 12. The periods $Y_1$, and $Y_2$ represent the commanded periods of the two-stage A/F transitions. The values $Z_1$ and $Z_2$ separately represent the commanded magnitudes, offset to stoichiometric, of the two-stage A/F transitions. If the commanded CEE ratio is more than 1.0, the magnitude offset Z is positive; otherwise, it is negative. The value $Z_1$ may be calibrated to match the engine rich condition to the secondary air flow, in order to obtain reasonable lean conditions of the catalytic converter 24. Although the A/F transitions are shown as step transitions, it is anticipated that ramp transitions may be substituted therefore. A ramp transition would be preferable in a situation where the CEE ratio is large enough to effect engine stability.

Figure 5:
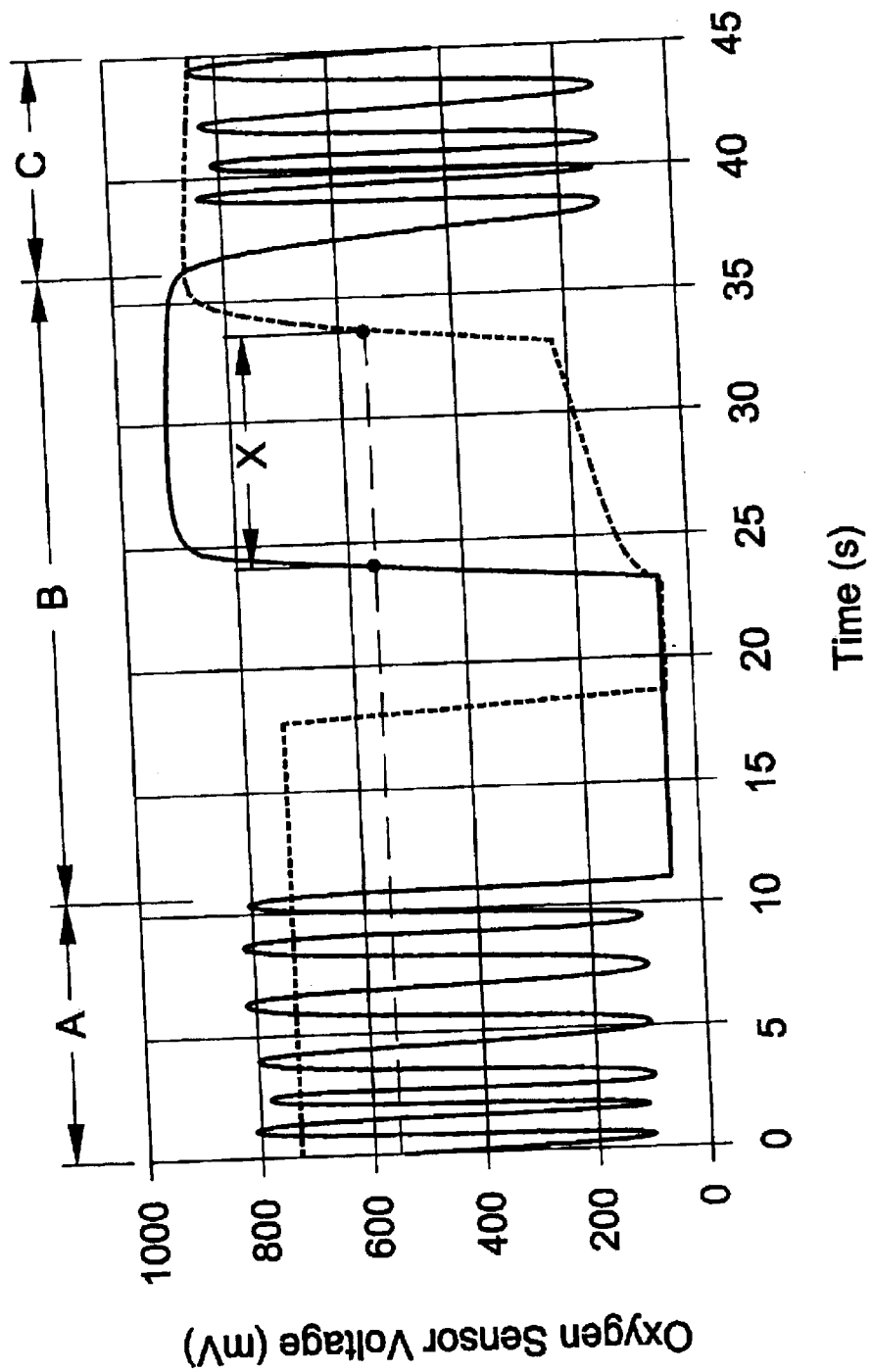
FIG. 5 is a graph showing inlet and outlet oxygen sensor voltage as a function of time according to the prior art.
Figure 6:
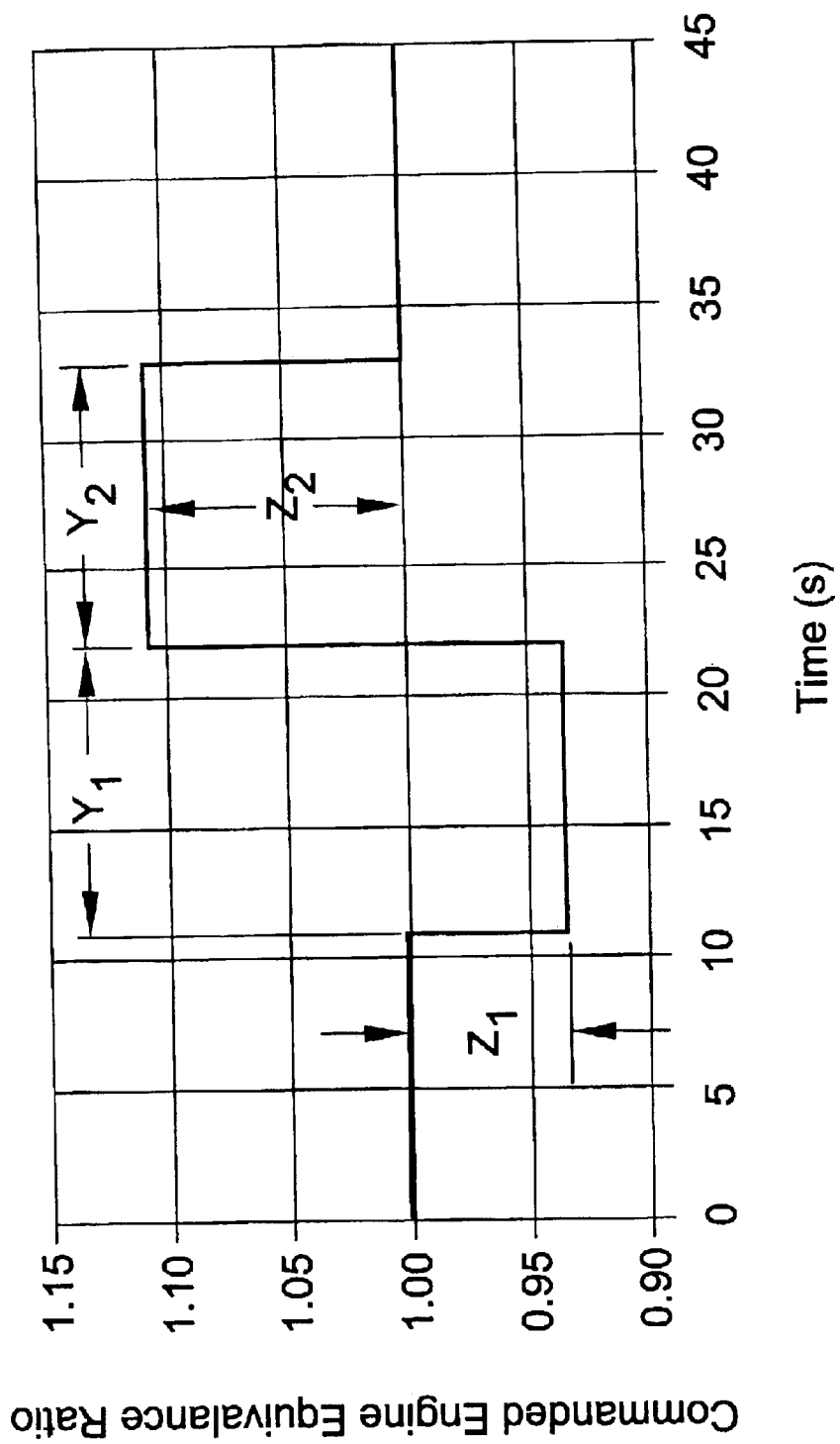
FIG. 6 is a graph showing a corresponding commanded equivalence ratio as a function of time for the data of FIG. 5.

Comparing FIGS. 3 and 4 to FIGS. 5 and 6 highlights advantages of the present invention. In particular, the section B of the traditional monitoring method is greater than that of the present monitoring method. This is due to a shorter lean period, and increased exhaust air flow with the present method. Thus, the present method is less intrusive than the traditional method. FIGS. 5 and 6 show the $O_2$ sensor 26, 28 responses and the CEE ratio for the conventional catalytic converter monitoring method. In FIG. 5, lean operation of the engine 14 results in a longer overall, intrusive monitoring period, whereby the engine 14 operates in the lean condition for an extended period of time until the outlet $O_2$ sensor 28 detects the lean condition. In FIG. 6, the extended lean operation of the engine 14 is caused by the dip in the CEE ratio. The lean to rich or rich to lean transition magnitude ($|Z_1|+|Z_2|$) of the traditional catalyst monitoring method is much larger than that ($|Z_2-Z_1|$) of the present catalyst monitoring method. Larger transitions are detrimental to engine performance, therefore, the reduced transition achievable by the present invention provides a significant improvement.

The method of the present invention monitors the secondary air injector and the catalytic converter to reduce intrusive operation of the engine. By reducing the magnitude of engine A/F transitions during the testing period, engine stability and vehicle drivability are improved as compared with conventional monitoring methods. Additionally, the catalytic converter monitoring time is reduced due to increased exhaust air flow and faster response, smaller A/F ratio transitions and decreased transition delay. Further, emissions are reduced as a result of the shorter engine rich condition and secondary air injection in period $Y_1$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for monitoring a catalytic converter, comprising:
    operating an engine in a rich condition;
    injecting air into an exhaust stream of said engine to simulate a lean condition;
    ceasing injection of said air into sad exhaust stream when an outlet sensor has detected said lean condition for a predetermined period of time;
    detecting said lean condition with an inlet sensor; and
    signaling a fault condition if said inlet sensor fails to detect said lean condition.

2. The method of claim 1 further comprising detecting an idle condition of said engine prior to operating said engine in said rich condition.

3. The method of claim 1 further comprising determining an equivalence ratio between a stoichiometric air-to-fuel (A/F) ratio and an actual A/F ratio.

4. The method of claim 1 wherein injecting air into the exhaust stream comprises:
    initiating a secondary air pump; and
    opening an inlet valve to enable injection of a secondary air stream into said exhaust stream.

5. The method of claim 1 further comprising:
    detecting said rich condition subsequent to said ceasing injection of said air using an inlet sensor;
    detecting said rich condition subsequent to said inlet sensor using said outlet sensor; and
    determining a lag time between said inlet and outlet sensors detecting said rich condition.

6. The method of claim 5 further comprising calculating an oxygen storage capacity of said catalytic converter based on said lag time.

7. The method of claim 6 further comprising determining an efficiency of said catalytic converter as a function of said storage capacity.

8. A catalytic converter monitor, comprising:
    a secondary air injector;
    a catalytic converter;
    an inlet sensor that senses a first oxygen level of exhaust gases entering said catalytic converter;
    an outlet sensor that senses a second oxygen level of exhaust gases exiting said catalytic converter;
    a controller that communicates with an engine, said inlet sensor and said outlet sensor, that initiates a rich condition after detecting an engine steady state condition, and that initiates said secondary air injector to inject a secondary air stream into said exhaust stream to simulate a lean opting condition, wherein said controller ceases operation of said secondary air injector when said outlet sensor has detected said lean condition for a predetermined period of time; and
    wherein said controller generates a secondary air injector fault if said inlet sensor fails to detect said lean condition.

9. The catalytic converter monitor of claim 8 wherein said controller measures a lag time between said inlet sensor detecting said rich condition after ceasing injection of said air and said outlet sensor detecting said rich condition.

10. The catalytic converter monitor of claim 8 wherein said secondary air injector includes a pump and a valve that enable injection of said secondary air stream into said exhaust gases.

11. The catalytic converter monitor of claim 8 further comprising an exhaust manifold located between said engine and said catalytic converter, wherein said secondary air injector is coupled to said exhaust manifold.

12. The catalytic converter monitor of claim 8 wherein said controller generates a secondary air injector pass signal if said inlet sensor detects said lean condition.

13. The catalytic converter monitor of claim 8 wherein said controller determines an oxygen storage capacity of said catalytic converter based on said lag time between said inlet and outlet sensors detecting said rich operating condition.

14. A method of monitoring a secondary air injector and a catalytic converter, comprising:
    operating an engine in a rich condition after detecting an engine steady state condition;
    initiating said secondary air injector to inject air into an exhaust stream to simulate a lean condition of said engine;

ceasing injection of said air into said exhaust stream after both an inlet and outlet sensor detect said lean condition;

determining a lag time between said inlet sensor detecting said rich condition after ceasing injection of said air and said outlet sensor detecting said rich operating condition; and signaling a secondary air injector fault if said inlet sensor fails to detect said lean condition.

15. The method of claim 14 wherein said ceasing occurs upon expiration of a predetermined time period after said outlet sensor detects said lean condition.

16. The method of claim 14 further comprising determining an equivalence ratio between a stoichiometric air-to-fuel (A/F) ratio and an actual A/F ratio.

17. The method of claim 14 further comprising calculating a storage capacity of said catalytic converter based on said lag time.

18. The method of claim 17 further comprising determining an efficiency of said catalytic converter as a function of said storage capacity.

* * * * *